(12) United States Patent
Guo et al.

(10) Patent No.: US 9,841,647 B2
(45) Date of Patent: Dec. 12, 2017

(54) LIQUID CRYSTAL DISPLAY, ELECTRONIC DEVICE AND LIQUID CRYSTAL PANEL

(71) Applicant: Wuhan China Star Optoelectronics Technology Co., Ltd., Wuhan, Hubei (CN)

(72) Inventors: Xingling Guo, Guangdong (CN); Chun-hung Huang, Guangdong (CN); Zhenzhou Xing, Guangdong (CN)

(73) Assignee: WUHAN CHINA STAR OPTOELECTRONICS TECHNOLOGY CO., LTD, Wuhan, Hubei (CN)

( * ) Notice: Subject to any disclaimer, the term of this patent is extended or adjusted under 35 U.S.C. 154(b) by 172 days.

(21) Appl. No.: 14/906,550

(22) PCT Filed: Dec. 30, 2015

(86) PCT No.: PCT/CN2015/099782
§ 371 (c)(1),
(2) Date: Jan. 20, 2016

(87) PCT Pub. No.: WO2017/096666
PCT Pub. Date: Jun. 15, 2017

(65) Prior Publication Data
US 2017/0269442 A1   Sep. 21, 2017

(51) Int. Cl.
*G02F 1/1335*   (2006.01)
*G02F 1/1362*   (2006.01)

(52) U.S. Cl.
CPC .. *G02F 1/136204* (2013.01); *G02F 1/133514* (2013.01); *G02F 1/133528* (2013.01); *G02F 1/136286* (2013.01); *G02F 2202/22* (2013.01); *G02F 2202/28* (2013.01)

(58) Field of Classification Search
CPC ................ H04N 9/3197; H04N 9/3105; G02F 2001/136218; G02F 2001/133334
See application file for complete search history.

(56) References Cited

U.S. PATENT DOCUMENTS

| 2009/0147167 A1* | 6/2009 | Park | G02F 1/134363 349/40 |
|---|---|---|---|
| 2010/0182524 A1* | 7/2010 | Nomura | G02F 1/133308 349/40 |

\* cited by examiner

*Primary Examiner* — Phu Vu
(74) *Attorney, Agent, or Firm* — Andrew C. Cheng

(57) ABSTRACT

The present disclosure provides a liquid crystal panel, which includes an array substrate, a color film substrate disposed opposite to the array substrate, and a polarizer including a main body and a extension part, a transparent conductive adhesive is disposed on the main body and the extension part, the main body is attached to a side of the color film substrate away from the array substrate through the transparent conductive adhesive, the extension part extends from the color film substrate, a ground point is disposed on the array substrate, and the extension part is attached to the ground point through the transparent conductive adhesive to form a discharge loop. The extension part is connected to the ground through the transparent conductive adhesive instead of the conductive silver plasma, it may achieve the technical effect of simplifying the production process, increasing the stability of the ground, and decreasing the production cost.

19 Claims, 3 Drawing Sheets

LIQUID CRYSTAL DISPLAY, ELECTRONIC DEVICE AND LIQUID CRYSTAL PANEL

CROSS-REFERENCE TO RELATED APPLICATIONS

This application claims the benefit of, and priority to, Chinese Patent Application No. 201510903533.5, filed Dec. 9, 2015, titled "liquid crystal display, electronic device, liquid crystal panel and manufacturing method thereof", the entire contents of which are incorporated by reference herein in its entirety.

FIELD OF THE INVENTION

The disclosure is related to liquid crystal display technology field, and more particular to a liquid crystal display with an anti-static structure.

BACKGROUND OF THE INVENTION

With the increasing development of the electronics industry, the digital tools, such as a mobile phone, a personal digital assistant, a notebook computer, a planet computer, are all developed toward a direction of more convenient, multifunction and beautiful. However, the display screen of the mobile phone, the personal digital assistant, the notebook computer and the planet computer is an indispensable human-machine communication interface. The thin film transistor liquid crystal display (TFT-LCD) with high frame quality, low power consumption, small radiation, and light and portable, etc. have been widely used in the electronic product, such as 3D TV, notebook computer, iPad, digital camera, iPhone, etc.

The existing full in cell liquid crystal panel includes: a color film substrate, an array substrate, and a liquid crystal and a sealant are further disposed between the color film substrate and the array substrate. In a working process of the liquid crystal panel, a static may be generated on the color film substrate and transmitted to a polarizer. Therefore, the polarizer with the conductivity to be adopted may usually be attached to a surface of CF glass, and the polarizer with the conductivity and a ground point on the TFT substrate are connected by dropping a conductive silver plasma, thereby releasing the static on the polarizer. However, the cost of the conductive polarizer is higher than the price of the ordinary polarizer, the process for dropping the conductive silver plasma is complex and the cost thereof is higher, and thus the manufacturing cost is high. Moreover, an attaching stability of the conductive silver plasma is not good. It is easily to disconnect to open the whole loop, thereby seriously affecting the production yield and the image quality of the liquid crystal panel.

SUMMARY OF THE INVENTION

A purpose of the present disclosure provides a liquid crystal panel, thereby increasing a stability of a polarizer grounding and decreasing the product cost.

Another purpose of the present disclosure provides a liquid crystal display adopting the above liquid crystal panel.

Another purpose of the present disclosure provides an electronic device adopting the above liquid crystal display.

Another purpose of the present disclosure provides a manufacturing method of the above liquid crystal panel.

In order to achieve the above purpose, the embodiment of the present disclosure provides the following technical schemes:

the present disclosure provides a liquid crystal panel, which includes an array substrate and a color film substrate disposed opposite to the array substrate, wherein the liquid crystal panel further includes a polarizer, the polarizer includes a main body and a extension part, a transparent conductive adhesive is disposed on the main body and the extension part, the main body is attached to a side of the color film substrate away from the array substrate through the transparent conductive adhesive, the extension part extends from a edge of the main body to the color film substrate, a ground point is disposed on the array substrate, the extension part is attached to the ground point through the transparent conductive adhesive, so as to form a discharge loop between the ground point and the main body.

In one embodiment, the extension part is disposed on a corner area of the polarizer.

In one embodiment, a quantity of the extension part is two, and the two extension parts are respectively disposed on two sides of the main body.

In one embodiment, a thickness of the transparent conductive adhesive is 0.01 mm to 0.1 mm.

In one embodiment, a transmittance of the transparent conductive adhesive is 30% to 80%.

In one embodiment, a resistance value of the transparent conductive adhesive per square inch is less than or equals to 0.02Ω.

In one embodiment, a ESD wiring is disposed on a surface of the array substrate, and the ground point is connected to the ESD wiring.

The present disclosure further provides a liquid crystal display, which includes a liquid crystal panel, wherein the liquid crystal panel includes an array substrate and a color film substrate disposed opposite to the array substrate, wherein the liquid crystal panel further includes a polarizer, the polarizer includes a main body and a extension part, a transparent conductive adhesive is disposed on the main body and the extension part, the main body is attached to a side of the color film substrate away from the array substrate through the transparent conductive adhesive, the extension part extends from a edge of the main body to the color film substrate, a ground point is disposed on the array substrate, the extension part is attached to the ground point through the transparent conductive adhesive, so as to form a discharge loop between the ground point and the main body.

In one embodiment, the extension part is disposed on a corner area of the polarizer.

In one embodiment, a quantity of the extension part is two, and the two extension parts are respectively disposed on two sides of the main body.

In one embodiment, a thickness of the transparent conductive adhesive is 0.01 mm to 0.1 mm.

In one embodiment, a transmittance of the transparent conductive adhesive is 30% to 80%.

In one embodiment, a resistance value of the transparent conductive adhesive per square inch is less than or equals to 0.02Ω.

The present disclosure provides a manufacturing method of a liquid crystal panel, which includes the following steps:

providing a liquid crystal panel main body, the liquid crystal panel main body includes a color film substrate and an array substrate stacked to each other, the array substrate includes a edge area correspondingly located outside the color film substrate, and a ground point is disposed inside the edge area;

providing a polarizer, the polarizer includes a main body and a extension part, and a transparent conductive adhesive is disposed on the main body and the extension part;

attaching the main body to a side of the color film substrate away from the array substrate through the transparent conductive adhesive, and the extension part extends from a edge of the main body to the color film substrate; and attaching the extension part to the ground point through the transparent conductive adhesive, so as to form a discharge loop between the ground point and the main body.

The present disclosure has the following advantage or beneficial efficiency.

In the present disclosure, the transparent conductive adhesive is disposed between the polarizer and the color film substrate, and the polarizer has the extension part, the extension part of the polarizer is bonded to the ground point on the array substrate through the transparent conductive adhesive, such that the static on the polarizer may be released through the polarizer to the ground point by the transparent conductive adhesive. By using the general polarizer instead of the conductive polarizer in prior art, the product cost may be effectively decreased. Further, the extension part is connected to the ground through the transparent conductive adhesive instead of the conductive silver plasma, it may achieve the technical effect of simplifying the production process, increasing the stability of the ground, and decreasing the production cost.

BRIEF DESCRIPTION OF THE DRAWINGS

In order to more clearly illustrate the prior art or the embodiments or aspects of the practice of the disclosure, the accompanying drawings for illustrating the prior art or the embodiments of the disclosure are briefly described as below. It is apparently that the drawings described below are merely some embodiments of the disclosure, and those skilled in the art may derive other drawings according the drawings described below without creative endeavor.

DETAILED DESCRIPTION

The following description with reference to the accompanying drawings is provided to clearly and completely explain the exemplary embodiments of the present disclosure. It is apparent that the following embodiments are merely some embodiments of the present disclosure rather than all embodiments of the present disclosure. According to the embodiments in the present disclosure, all the other embodiments attainable by those skilled in the art without creative endeavor belong to the protection scope of the present disclosure.

Figure 1:
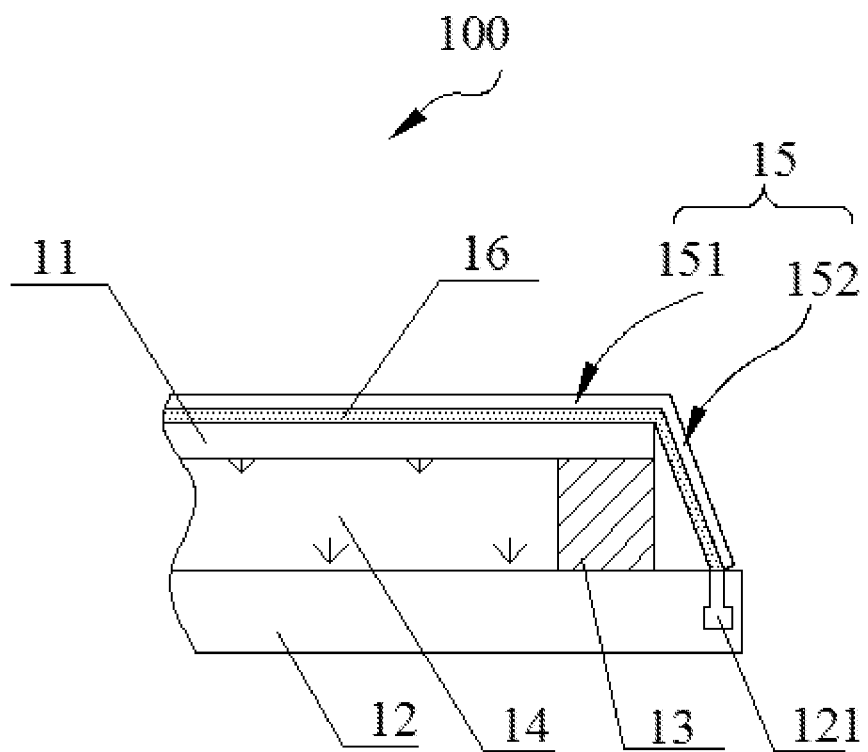
FIG. 1 is a cross-sectional view of a liquid crystal panel according to an embodiment of the present disclosure.
Figure 2:
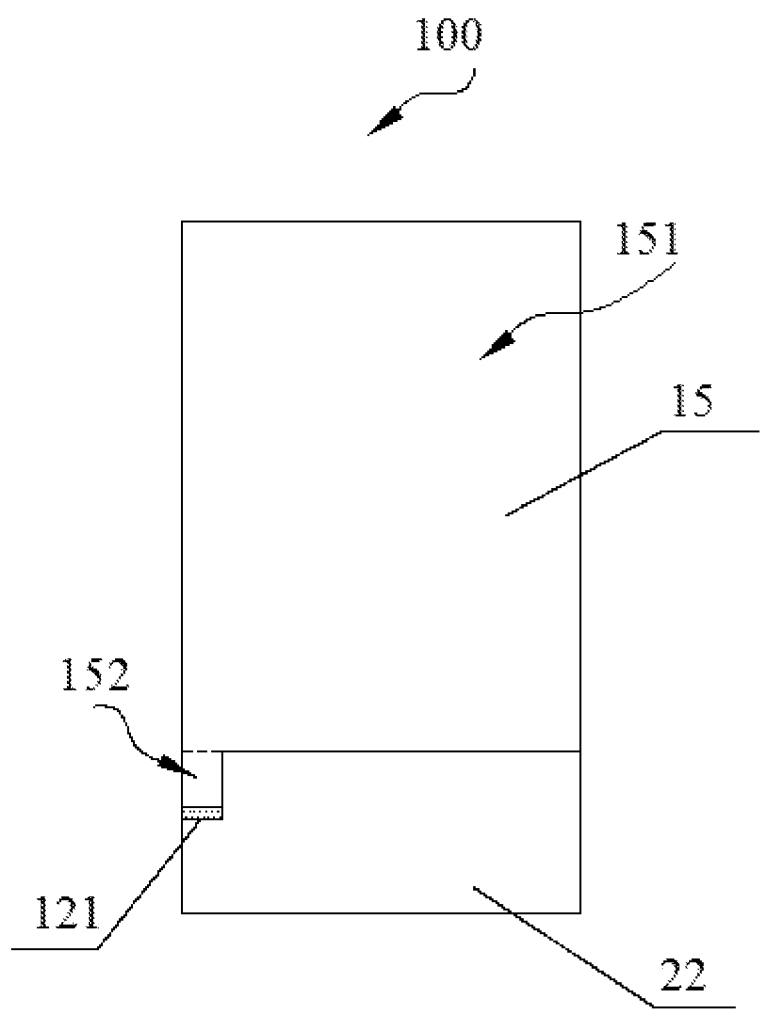
FIG. 2 is a top view of the liquid crystal panel of FIG. 1 according to an embodiment of the present disclosure.

Please refers to FIG. 1 and FIG. 2, FIG. 1 is a cross-sectional view of a liquid crystal panel according to an embodiment of the present disclosure, and FIG. 2 is a top view of the liquid crystal panel according to an embodiment of the present disclosure. The liquid crystal panel 100 mainly includes an array substrate 11 and a color film substrate 12. The color film substrate 12 disposed opposite to the array substrate 11, and both of them are bonded as a box-like structure through a sealant 13. The liquid crystal 14 is sealed in the box-like structure. A polarizer 15 is disposed on a side of the color film substrate 11 away from the array substrate 12. The polarizer 15 includes a main body 151 and an extension part 152, and a transparent conductive adhesive 16 is disposed on a side of the polarizer 15 near the color film substrate 11. The main body 151 of the polarizer is attached to a side of the color film substrate 12 away from the array substrate 12 through the transparent conductive adhesive 16, the main body 15 is disposed opposite to the color film substrate 11, and the extension part 152 extends from the color film substrate 11. A ground point 121 is disposed on the array substrate 12, and the extension part 152 is attached to the ground point 121 through the transparent conductive adhesive 16. The polarizer 15 transmits the static to the transparent conductive adhesive 16 and the static on the polarizer 15 is outputted through the transparent conductive adhesive below the extension part 152, such that the polarizer 15 maintains a zero potential. That is, when a static is generated on a surface of the liquid crystal panel, the static on the surface of the liquid crystal panel 100 is pulled down to the zero potential through the polarizer connected to the ground point, such that a static charge is released through a path formed among the polarizer 15, the transparent conductive adhesive 16 and the ground 121.

Figure 3:
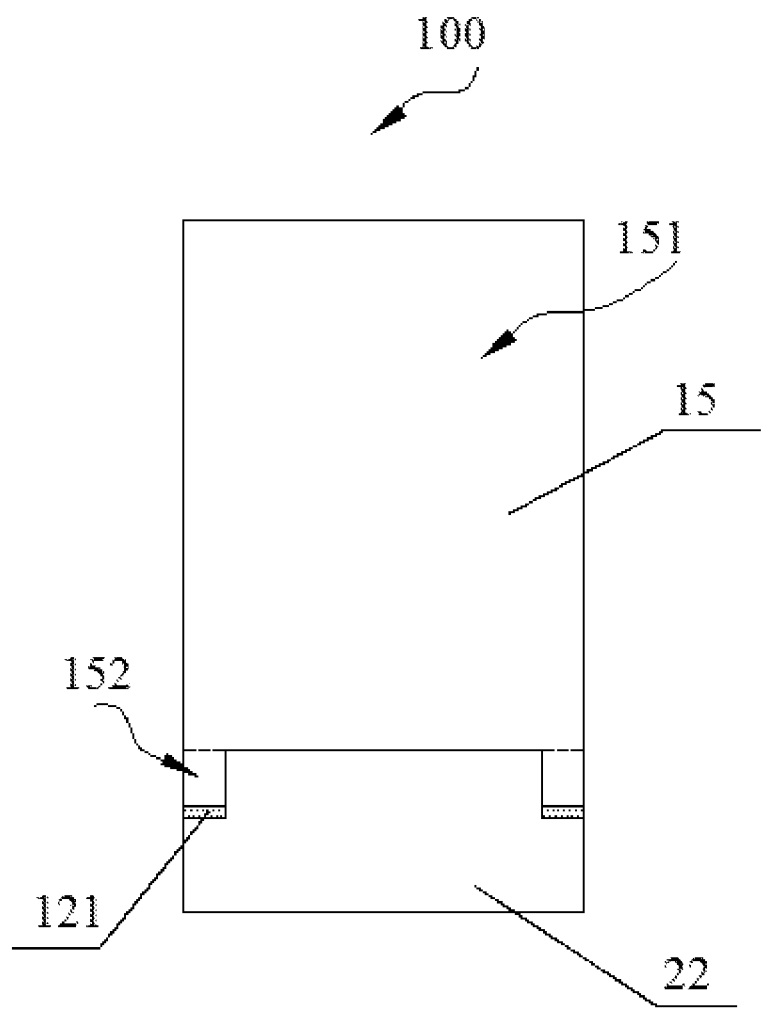
FIG. 3 is a top view of a liquid crystal panel according to another embodiment of the present disclosure.

Please refers to FIG. 3, in another embodiment of the present disclosure, a quantity of the extension part 152 is two, the two extension parts 152 are respectively disposed on two sides of the polarizer 15 and are respectively connected two ground points 121 with respect to the array substrate 12. Obviously, a quantity of the extension part 152 may be more than two, a quantity of the ground point 121 on the array substrate 12 is also correspondingly increased. When a quantity of the extension part 152 is more, the speed of the static to be outputted is faster.

In the present disclosure, the transparent conductive adhesive is disposed between the polarizer and the color film substrate, and the polarizer has the extension part, the extension part of the polarizer is bonded to the ground point on the array substrate through the transparent conductive adhesive, such that the static on the polarizer may be released through the polarizer, the transparent conductive adhesive to the ground point. By using the general polarizer instead of the conductive polarizer in prior art, the product cost may be effectively decreased. Further, the extension part is connected to the ground through the transparent conductive adhesive instead of the conductive silver plasma, it may achieve the technical effect of simplifying the production process, increasing the stability of the ground, and decreasing the production cost.

Further, since a distribution of the charge generally satisfies that the curvature is larger where the charge density is larger and the curvature is smaller where the charge density is smaller, a corner of the liquid crystal panel, such as a sharp area, is the area in which the static may be released easier. In other words, the extension part 151 should be disposed on a corner area of the polarizer. That is, the edge of the extension 151 overlaps the two edges intersected on the color filter substrate. Therefore, it may easily release the external static, thereby minimizing the static impact for the liquid crystal panel.

This is more likely to be released outside of electrostatic, thus minimizing the impact of the liquid crystal panel by electrostatic Further, the transparent conductive adhesive 16 may be formed by adding the conductive particle into the transparent adhesive layer. Preferably, the transparent conductive adhesive 16 may be formed by an acrylic adhesive and a nickel powder served as the main material, of course, the material of the transparent conductive adhesive 16 may be made by adopting Indium Tin Oxide (ITO), Antimony Doped Tin Oxide (ATO), Indium Zinc Oxide (IZO), Aluminum Zinc Oxide (AZO) or made by adopting other metal and metal oxide. Preferably, the selected material may make the transparent conductive adhesive 16 as the transparent conductive layer, so as to increase the transmittance of the light.

Further, the transparent conductive adhesive 16 with different thickness has different conductive performance. In general, the thickness of the transparent conductive adhesive 16 is larger, such that the conductive performance is better, but the transmittance of the transparent conductive adhesive 16 may be correspondingly decreased under the same condition. Furthermore, the thickness of the transparent conductive adhesive 16 is smaller, such that the conductive performance is worse, but the transmittance of the transparent conductive adhesive 16 may be correspondingly increased under the same condition. Furthermore, the thickness of the transparent conductive adhesive is increased, such that the manufacturing cost is also increased. Therefore, the conductive layer 4 needs having an appropriate thickness, so as to compromise between the conductive performance and the transmittance, such that the transparent conductive adhesive 16 has not only a good conductivity but also a larger transmittance. Preferably, the thickness of the transparent conductive adhesive 16 is 0.01 mm to 0.1 mm, further preferably, the thickness is 0.05 mm. When the thickness of the transparent conductive adhesive 16 is 0.05 mm, the cost is also relatively low.

Further, it should be ensured that the transparent conductive adhesive 16 has an appropriate resistance value. In general, it should be ensured that the resistance value of the transparent conductive adhesive per square inch is less than or equals to $0.02\Omega$.

Further, it should be ensured that a transmittance of the conductive adhesive 4 is 30% to 80%.

Further, in the present disclosure, the transparent conductive paste 16 may be coated on the polarizer 15 by adopting a spin coating method.

Further, the surface on the array substrate 12 is formed with an electrical static discharge (ESD) wiring (not shown). The wiring is formed with the ground point 121. The ESD wiring surrounds the periphery of the array substrate, and at least one terminal of the ground trace is connected to a pin of the flexible printed circuit board for inputting a ground signal.

Further, the ESD wiring may be connected to the ground point of the flexible printed circuit board through the driver IC. Therefore, by using the principle of static shielding, the ground signals of the whole system are connected to the ground traces inside the panel through the leads of the flexible printed circuit board. The static shielding is achieved by the ground traces, thereby increasing the antistatic ability of the whole array substrate, and increasing the antistatic ability of the liquid crystal panel.

Preferably, the ESD wiring may be formed by a metal material, such as Mo, Cr, etc.

The present disclosure further provides a manufacturing method of a liquid crystal panel, which mainly includes the following steps:

firstly, a liquid crystal panel main body is provided, the liquid crystal panel main body includes a color film substrate and an array substrate stacked to each other, wherein the array substrate includes a edge area correspondingly located outside the color film substrate, and a ground point is disposed inside the edge area.

A polarizer is provided. The polarizer and the ordinary polarizer are different that the polarizer includes a main body and an extension part extended from the main body, and a transparent conductive adhesive is disposed on the main body and the extension part. The main body is attached to a side of the color film substrate away from the array substrate through the transparent conductive adhesive, and the extension part extends from an edge of the main body to the color film substrate.

Finally, the extension part is attached to the ground point through the transparent conductive adhesive, so as to form a discharge loop between the ground point and the main body.

The present disclosure further provides a liquid crystal display, and the liquid crystal display of the present disclosure includes any one of the above liquid crystal panel.

The present disclosure further includes an electronic device adopting the above the liquid crystal display, and the electronic device may be any electronic device with a display function, such as a mobile phone, a tablet computer, a television, monitor, a notebook computer, a digital picture frame, a navigation, etc.

The above embodiments do not constitute a limitation of protection scope of the technical solution. Any modifications equivalent replacement and improvement made within the spirit and principle of the above embodiments should be included within the protection scope of the technical solution.

What is claimed is:

1. A liquid crystal panel, comprising an array substrate and a color film substrate disposed opposite to the array substrate, wherein the liquid crystal panel further comprises a polarizer, the polarizer comprises a main body and a extension part, a transparent conductive adhesive is disposed on the main body and the extension part, the main body is attached to a side of the color film substrate away from the array substrate through the transparent conductive adhesive, the extension part extends from a edge of the main body to the color film substrate, a ground point is disposed on the array substrate, the extension part is attached to the ground point through the transparent conductive adhesive, so as to form a discharge loop between the ground point and the main body.

2. The liquid crystal panel according to claim 1, wherein the extension part is disposed on a corner area of the polarizer.

3. The liquid crystal panel according to claim 2, wherein a quantity of the extension part is two, and the two extension parts are respectively disposed on two sides of the main body.

4. The liquid crystal panel according to claim 1, wherein a thickness of the transparent conductive adhesive is 0.01 mm to 0.1 mm.

5. The liquid crystal panel according to claim 4, wherein a transmittance of the transparent conductive adhesive is 30% to 80%.

6. The liquid crystal panel according to claim 4, wherein a resistance value of the transparent conductive adhesive per square inch is less than or equals to $0.02\Omega$.

7. The liquid crystal panel according to claim 1, wherein a ESD wiring is disposed on a surface of the array substrate, and the ground point is connected to the ESD wiring.

8. A liquid crystal display, comprising a liquid crystal panel, wherein the liquid crystal panel comprises an array substrate and a color film substrate disposed opposite to the array substrate, wherein the liquid crystal panel further comprises a polarizer, the polarizer comprises a main body and a extension part, a transparent conductive adhesive is disposed on the main body and the extension part, the main body is attached to a side of the color film substrate away from the array substrate through the transparent conductive adhesive, the extension part extends from a edge of the main body to the color film substrate, a ground point is disposed on the array substrate, the extension part is attached to the ground point through the transparent conductive adhesive, so as to form a discharge loop between the ground point and the main body.

9. The liquid crystal display according to claim 8, wherein the extension part is disposed on a corner area of the polarizer.

10. The liquid crystal display according to claim 9, wherein a quantity of the extension part is two, and the two extension parts are respectively disposed on two sides of the main body.

11. The liquid crystal display according to claim 8, wherein a thickness of the transparent conductive adhesive is 0.01 mm to 0.1 mm.

12. The liquid crystal display according to claim 11, wherein a transmittance of the transparent conductive adhesive is 30% to 80%.

13. The liquid crystal display according to claim 11, wherein a resistance value of the transparent conductive adhesive per square inch is less than or equals to 0.02Ω.

14. A electronic device, comprising a liquid crystal display, the liquid crystal display comprises a liquid crystal panel, wherein the liquid crystal panel comprises an array substrate and a color film substrate disposed opposite to the array substrate, wherein the liquid crystal panel further comprises a polarizer, the polarizer comprises a main body and a extension part, a transparent conductive adhesive is disposed on the main body and the extension part, the main body is attached to a side of the color film substrate away from the array substrate through the transparent conductive adhesive, the extension part extends from a edge of the main body to the color film substrate, a ground point is disposed on the array substrate, the extension part is attached to the ground point through the transparent conductive adhesive, so as to form a discharge loop between the ground point and the main body.

15. The electronic device according to claim 14, wherein the extension part is disposed on corner area of the polarizer.

16. The electronic device according to claim 15, wherein a quantity of the extension part is two, and the two extension parts respectively disposed on two sides of the main body.

17. The electronic device according to claim 14, wherein a thickness of the transparent conductive adhesive is 0.01 mm to 0.1 mm.

18. The electronic device according to claim 17, wherein a transmittance of the transparent conductive adhesive is 30% to 80%.

19. The electronic device according to claim 17, wherein a resistance value of the transparent conductive adhesive per square inch is: ≤0.02Ω.

* * * * *